Dec. 16, 1924.
S. R. MULLARD
SUSPENSION OF INCANDESCENT FILAMENTS
Filed Oct. 2, 1922
1,519,412
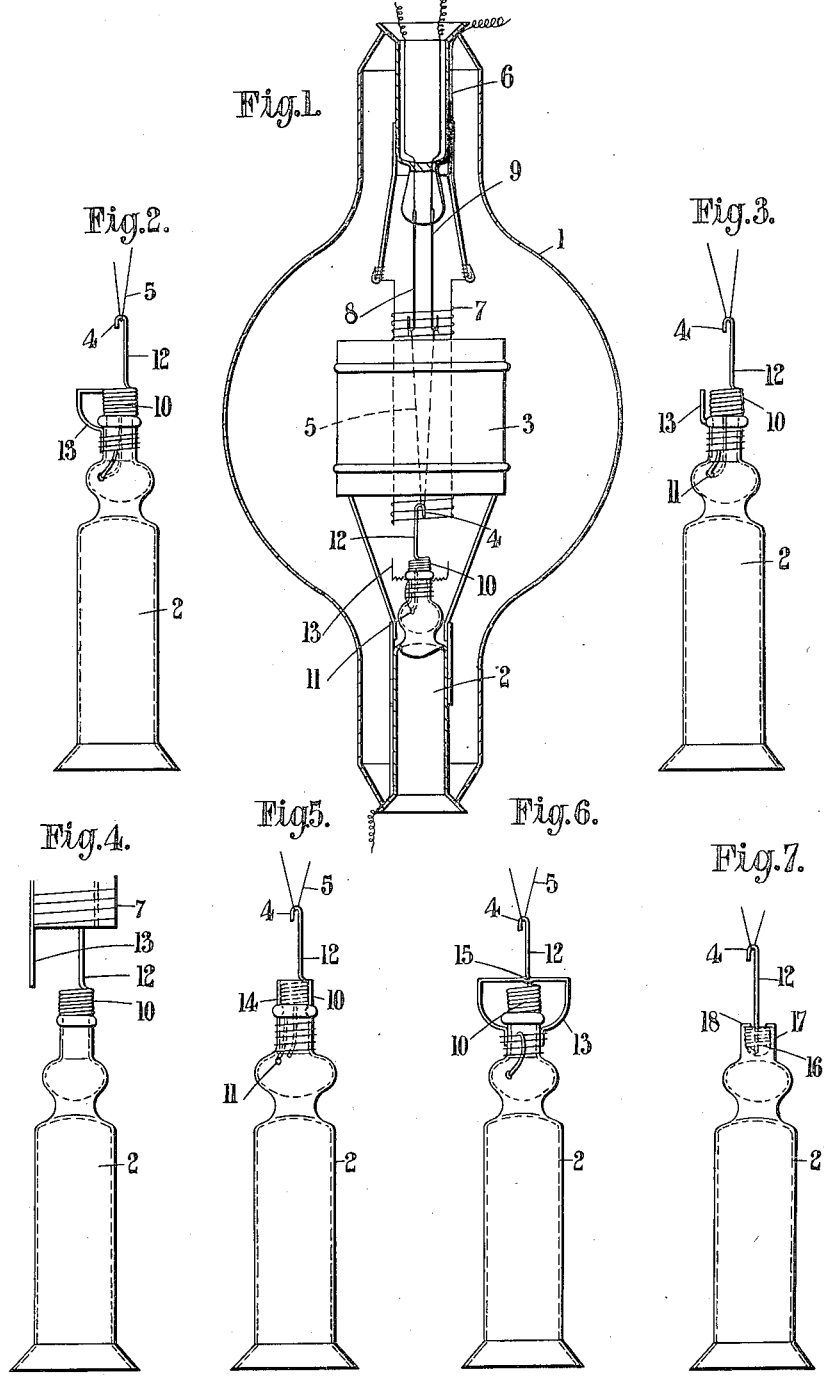

Patented Dec. 16, 1924.

1,519,412

UNITED STATES PATENT OFFICE.

STANLEY ROBERT MULLARD, OF HAMMERSMITH, LONDON, ENGLAND, ASSIGNOR TO THE MULLARD RADIO VALVE COMPANY LIMITED, OF HAMMERSMITH, LONDON, ENGLAND.

SUSPENSION OF INCANDESCENT FILAMENTS.

Application filed October 2, 1922. Serial No. 591,951.

*To all whom it may concern:*

Be it known that I, STANLEY ROBERT MULLARD, a British subject, and resident of 35 Claybrook Road, Hammersmith, London W. 6, England, have invented certain new and useful Improvements in and Relating to the Suspension of Incandescent Filaments (for which I have filed an application in England, dated 18th October, 1921), of which the following is a specification.

This invention relates to the method of and means for supporting or anchoring filaments and particularly for supporting the filamentary cathodes of thermionic valves or electron discharge tubes which operate at incandescence.

It is the chief purpose of the present invention to ensure that the tension of such filaments will have the most suitable value and to enable the operative to judge with accuracy the correct amount of tension.

Broadly defined, the present invention consists in supporting a filament in such a manner that it is placed in tension by means of the stress in a spring arranged so that its stress may be readily gauged, preferably by a visual indication, by the operative. It is preferred to employ a helical tension spring which is secured to one end of the filament in the case of a straight filament, or to the bight in the case of a hair-pin filament.

One object of the invention consists in the provision of a gauge or indicator which is fixed within the bulb of the valve or other device in such a position that when a point on the anchoring spring bears a certain relation to the gauge, the tension on the filament is at its most suitable value. Such a gauge may be calibrated to correspond to different amounts of tension, but this will not usually be necessary.

According to one embodiment of the present invention, the gauge may comprise a rigidly supported wire pointer so arranged that when the helical tension spring supporting the filament extends longitudinally, a point on the spring or other movable element associated with it comes opposite a point on the gauge.

Such a gauge may be fixed to the glass or quartz stem which supports one or more electrodes of the valve and may comprise opposite wires extending parallel to the stem, or a single wire with its end turned at right angles to the stem, or again the gauge may be an extension of the stem and formed of glass or quartz. Such extension may be a projection on one side, or may be a tubular extension within which the tension spring is located. The end of such tubular extension may serve as the gauging mark, or one or more marks may be placed on the tubular extension. Again, in the case of a three-electrode tube the gauge may be supported by the grid electrode of the tube.

Another useful embodiment of the invention is furnished with means for preventing the tension spring from extending beyond a certain limit, the tension on the filament at that limit being of just the required amount. In this form a buffer rigidly supported on the stem of the tube is arranged so that when the spring is extended sufficiently, it comes into contact with the buffer which prevents any further expansion. This buffer may consist of a wire carrying a central eye or a disc furnished with a central hole through which passes the straight wire between the portion of the spring nearest the filament and the end of the filament. Such eye or hole allows the straight wire to slide through, but prevents the helical spring from being stretched beyond the desired amount. Again a flexible wire may be connected between the two ends of the tension spring. Before the spring is extended the wire would be slack, but as the spring is drawn out the said wire would straighten and prevent the spring extending beyond the length of the wire. Instead of a tension spring, compression springs or other forms of spring may be employed. In the case of a compression spring, it may be enclosed in a tube attached to the stem at one end and having a constricted opening at the other. Through this opening passes the shank of the hook to which the filament is attached. The portion of the shank inside the tube passes through the middle of the spring and ends in a cupshaped piston which presses on the end of the spring remote from the filament and compresses the spring. The compression of the spring is adjusted as before by noting the relative position of a point on a member which moves when the spring is stretched with relation to a stationary point. The invention is particularly useful when a spring is employed enclosed in an insulated tube and is either compressed or extended inside such a tube. The wall of the tube in this case is provided with a mark so as to serve as the indicator or gauge and the face of the spring is adjusted by noting the relative positions between the said mark and a point on the spring or wire attached thereto.

The present invention may be carried into practise in a multiplicity of ways, which will readily occur to those engaged in the art. However, the invention will be more readily appreciated from the following description of some embodiments of the invention when taken in conjunction with the annexed drawings, in the various figures of which the same reference numerals refer to corresponding parts. In these drawings:—

Figure 1 is a view of a three electrode thermionic valve or electron discharge tube, having the cathode supported in accordance with the present invention;

Figure 2 shows the stem and filament hook of a modified embodiment;

Figures 3, 4, 5, 6 and 7 are similar views of further embodiments.

Referring first to Figure 1, the bulb 1 is furnished with a lower stem 2 upon which is carried the cylindrical anode or plate 3 and which carries the lower hook 4 for the filamentary cathode 5. The upper stem 6 supports the grid electrode 7 and two anchor hooks or leading-in wires 8, 9, for the ends of the filament 5, which in this example is of hairpin shape. The spring 10 is a helical tension spring and its lower end is anchored by being passed through the upper tubular end of the stem 2 and then bent outwards through a small aperture 11 in that stem. The upper end of the spring 10 is connected to a link 12 preferably of molybdenum and preferably of larger diameter than the spring 10 in order to prevent the latter from being over-heated. The link 12 is turned over at its upper end to form the hook 4 to which the filament is attached. A wire 13 is fixed to the upper projection of the stem 2 so that its free ends project beyond the end of the spring towards the filament 5. While the lower seal of the valve is soft, the stem 2 is pulled downwards stretching the spring 10 until the uppermost turn of the spring 10 is in line with the tips of the wire 13. The ends of the latter are made of such a length that when the spring 10 is so stretched it imparts the correct tension to the filament 5. The spring 10 may also be stretched by pulling the filament seal upwards at the upper end of the valve whilst the seal is still soft.

In the embodiment illustrated in Figure 2, only one end of the wire 13 is employed and this is bent inwards and is of such a length that the top of the helical spring 10 just touches it when the correct tension is applied.

In the embodiment shown in Figure 3, the gauge 13 is in the form of a glass or silica lug, according to the material of the stem, the gauge 13 being an integral part thereof.

In another embodiment of the invention shown in Figure 4, the gauge 13 takes the form of a wire attached to, or an extension of the grid 7.

Figure 5 shows another construction in which the upper end 14 of the stem 2 is made tubular to accommodate the spring 10. In this case the height of the tubular part is so arranged that when the top of the helical spring 10 is level with the top of the tubular part 14, the correct tension is applied to the filament. If desired, however, the part 14 could be made longer and could bear a mark to which the top of the helical spring should be adjusted.

A rather different arrangement is shown in Figure 6. In this embodiment the gauge 13 consists of a wire bent above the end of the stem 2 and having made in it a small loop 15 through which the connecting link 12 or the upper end of the spring 10 can pass. When the spring 10 is stretched so that its upper turn reaches the loop 15, the tension is correct.

In Figure 7 is shown a modified form showing the use of a compression spring 16. This spring is enclosed in a tube 17 attached to the upper end of the stem 2, said tube being provided with inwardly turned lugs 18 which are adapted to hold the spring 16 inside the tube 17. The link 12 passes centrally through the compression spring 16 and at its lower end is attached to the lowermost coil of the spring 16. The compression of the spring 16 is adjusted as hereinbefore described by noting the relative position of the lowermost coil of the spring, for example, with relation to a fixed point on the tube.

Having thus described my invention what I claim as new and desire to secure by Letters Patent is:—

1. In combination, a filament, means for fixing one end of said filament, a fixed gauge and a spring connected to another point in said filament and stressed until a predetermined point in said spring bears a definite relationship to said gauge.

2. In combination, a bulb, a filament having one end fixed in relation to said bulb, a fixed gauge and a tension spring in the form of a helix fixed to another point in said filament and stretched until the end turn of the helix is in alinement with said gauge.

3. In combination, a bulb, a filament mounted in said bulb with one end fixed in relation to said bulb, a stem in said bulb, a gauge supported upon said stem and comprising a member with an eye, a spring fixed to another point in said filament and stretched to tension said filament until the spring contacts with said gauge adjacent the eye thereof.

4. An incandescent filament device, comprising a bulb, a hairpin filament therein having both of its ends fixed in relation to said bulb, a stem secured to said bulb opposite the bight of said filament, a gauge comprising a fixed member projecting outwards from said stem and a helical tension spring anchored at one end to said stem and at the opposite end to the bight of said filament and stretched until a predetermined point in said spring is in alinement with said gauge.

5. A thermionic valve comprising a bulb having stems at opposite parts thereof, two hooks projecting from one of said stems, a hairpin filament having its ends fixed to said hooks, an anode and grid supported upon said stems, a gauge fixed to the stem opposite said hooks and a tension spring in the form of a helix anchored to said last-named stem and to the bight of said filament and stretched until the outer turn of the helix comes into alinement with said gauge.

6. Means for anchoring a filament comprising a stem with a gauge consisting of a wire fastened to the stem and bent to have a portion at right angles to the axis of the stem with an eye concentric with the stem, a tension spring in the form of a helix fastened to said stem at one end and at the other end formed as a hooked shank passing through said eye and engaging the bight of the filament, said spring being stretched until the turn of the helix nearest the filament comes into contact with said gauge.

STANLEY ROBERT MULLARD.